S. C. SHAFFNER.
MEANS FOR RECORDING METER READINGS.
APPLICATION FILED NOV. 8, 1910.
Reissued Apr. 4, 1911.
13,224.
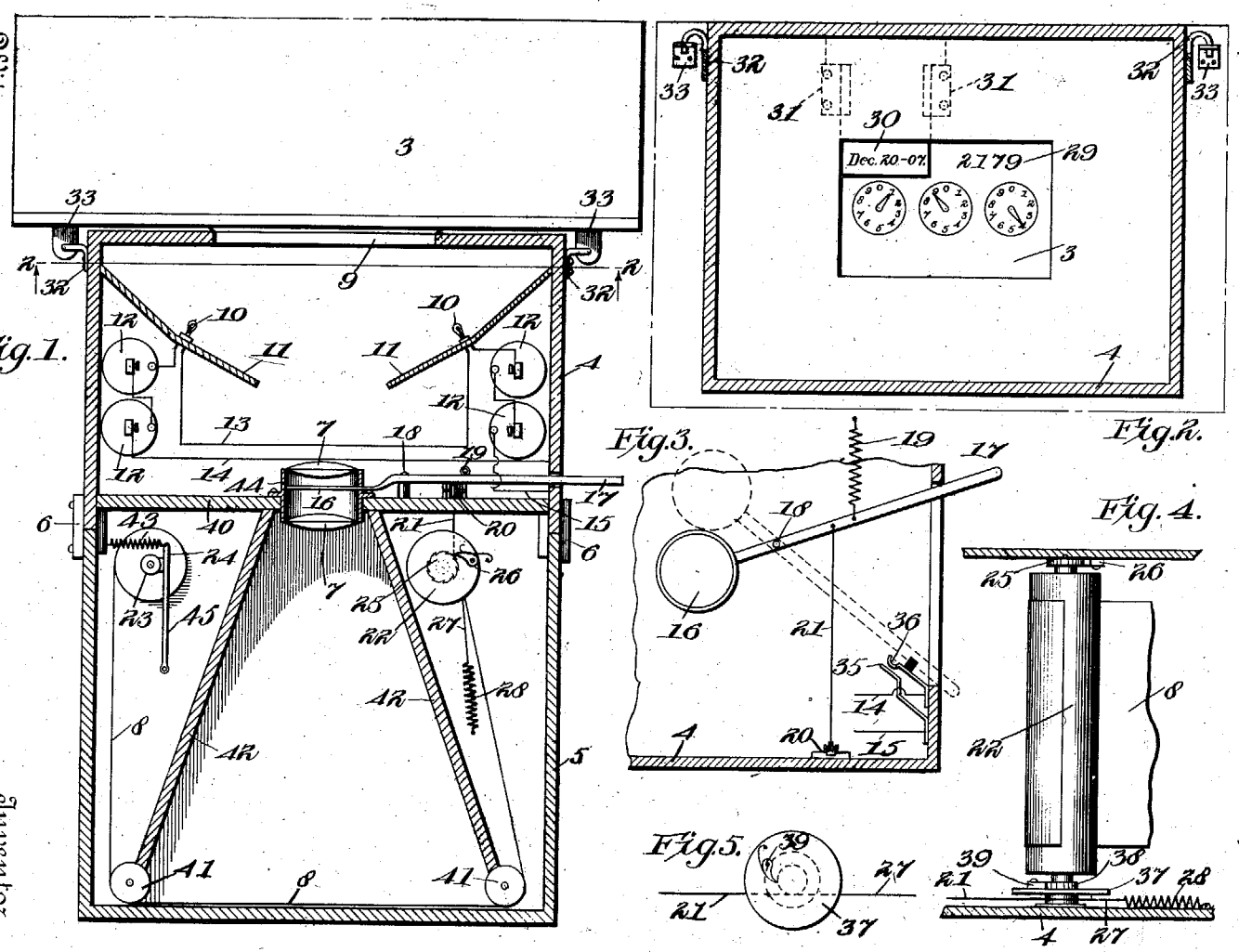
Witnesses
Byron B. Collings.
Edwin J. Beller.
Inventor
Samuel C. Shaffner,
By Wilkinson, Fischer & Witherspoon
Attorneys

UNITED STATES PATENT OFFICE.

SAMUEL C. SHAFFNER, OF CHICAGO, ILLINOIS, ASSIGNOR TO CHARLES M. PATTERSON, OF WHITE PLAINS, NEW YORK.

MEANS FOR RECORDING METER-READINGS.

13,224. Specification of Reissued Letters Patent. Reissued Apr. 4, 1911.

Original No. 906,071, dated December 8, 1908, Serial No. 409,654. Application for reissue filed November 8, 1910. Serial No. 591,397.

*To all whom it may concern:*

Be it known that I, SAMUEL C. SHAFFNER, a citizen of the United States, residing at Chicago, in the county of Cook and State of Illinois, have invented a certain new and useful Improvement in Means for Recording Meter-Readings, of which the following is a full, clear, concise, and exact description, reference being had to the accompanying drawings, forming a part of this specification.

My invention relates to an improved means for recording the readings of meters and it consists essentially of mechanism adapted to be placed in juxtaposition to a meter and when operated, to make a record photographically of the condition of the meter.

This invention is especially designed to make accurate and infallible photographs of the indices of gas, water and electric meters, but is not restricted to this use.

In the past, much dissatisfaction has existed on the part of the users of meters owned by various public service corporations, resulting from the neglect or carelessness of the meter readers, who frequently have entirely omitted to read the meters and have depended upon averages of previous readings to furnish a basis for report. By my invention these objections are overcome and the abuses to which previous systems of obtaining meter readings have been subject is prevented.

In carrying out my invention, I place in juxtaposition to the meter whose reading is desired a photographic apparatus designed to make a record on sensitized paper or film by means of electric light or other sources of illumination, and my invention further contemplates the entire operation of the photographic recording mechanism by a single movement of an operating lever or handle. In other words, the movement of the lever or handle in one direction opens the lens shutter and causes the illumination, and the return of the lever or handle to the starting point sets the apparatus ready for the next record.

In the accompanying drawings—Figure 1 is a top plan view showing diagrammatically part of a meter and mechanism in juxtaposition therewith, made in accordance with my invention, for producing the results described. Fig. 2 is a vertical section, taken on the line 2—2 of Fig. 1 and looking in the direction of the arrows. Fig. 3 is a detail view, showing the operating lever or handle and related parts. Fig. 4 is a detail view of the roller used to receive the film or strip of sensitized paper after exposure. Fig. 5 is a detail view of part of the mechanism for operating the roller shown in Fig. 4.

3 represents a part of a meter, on the front of which and on either side of the dial opening are secured lugs or eyes 33.

4 represents a casing in which the photographic apparatus is located. This casing has an opening 9 at one end and a partition 40, which divides said casing into two compartments, the rear compartment being the larger. The rear walls 5 of the casing 4 are removable, to afford access to the sensitized roll and ordinarily are secured to the main portion of the casing 4 by hooks or catches 6.

Carried on the casing 4, near the front end thereof, are hooks 32, adapted to enter the lugs or eyes 33 on the meter. The purpose of these lugs or eyes and hooks cooperating therewith is to securely hold the casing 4 and meter 3 in such a relation that the photographic device in the casing 4 may properly perform its function. These hooks 32 and lugs or eyes 33 are not indispensable, for excellent meter readings can be obtained by simply holding the casing 4 close to the meter to be read, with the opening 9 in proximity to the dial opening of the meter and then manipulating the apparatus, as hereinafter described.

Mounted in the casing 4 near the front thereof are inclined screens 11, which extend back and toward each other, but leaving a space between their adjacent ends just behind the opening 9. On the front of each of these screens 11 an electric light 10, or other source of light, is secured. In the space behind the screens 11 and in front of the partition 40, electric batteries 12 are secured, although these batteries might be carried by the operator, in his pocket or on a belt, for example, with the wires running to the lamps 10.

Mounted centrally of the partition 40 is the lens 7. This is preferably a compound lens, as shown in Fig. 1, consisting of two lenses mounted in the ends of a cylindrical tube 44, which tube is secured to the partition 40.

16 represents a movable shutter, adapted, in a certain position, to cover the opening in the partition 40 in which the lens is secured. As shown in Fig. 1, the shutter 16 is adapted to be swung into the lens tube, thus cutting off the light from the rear compartment, but obviously the lens and shutter could be arranged so that the shutter could be swung back and forth either in front of the lens or behind it.

In the rear compartment two rollers 22 and 23 are mounted, the former being the receiving roller and the latter the supply roller. Sensitized paper or film 8 is fed, as hereinafter described, from the roller 23 to the roller 22, passing over the guide rollers 41, located near the rear corners of the casing 4. Partitions or screens 44, running from the lens opening in the partition 40 back to the rollers 41, are provided, to prevent the light which passes through the lens 7 from affecting any part of the film or strip 8, except that part of it that is exposed between the guide rollers 41. The screens 42 may be covered with black felt or similar light excluding material, and in fact the entire casing 4, especially the rear compartment thereof, may be provided with a similar interior lining. In fact the casing 4, and the parts carried thereby, constitute a camera obscura, provided with illuminating means.

The shutter 16 is mounted on one end of a lever or handle 17, pivoted at 18 on the partition 40. One end of this lever passes out through a slot in the side of the casing 4, so that it may be easily reached by the operator. A spring 19 normally holds said lever in its highest position, as shown in full lines on Fig. 3, and acts to return the parts to their original position after a photograph has been taken.

A cord 21 is fastened at one end to the lever 17 and passes over the guide pulley 20 mounted on the bottom of the casing 4. The receiving roller 22 is mounted in bearings in the top and bottom walls of the casing 4. The roller 22 carries at the upper end of its axle a ratchet wheel 25, which coöperates with a pawl 26, which is secured to the under side of the top of the casing 4 in such a manner as to prevent back rotation of the roller 22. On the lower end of the axle of the roller 22 is carried a ratchet wheel 38, adapted to coöperate with a pawl 39 mounted on a drum 37. The drum 37 is loosely mounted on the axle of the roller 22. The result is that the drum 37 may be rotated freely in a direction opposite to the winding of the film or paper strip on the roller 22, but when moved in the opposite direction, by means hereinafter described, will cause the rotation of the roller 22. One end of the cord 21 is secured to the drum 37 and another cord 27 is secured at one end to said drum, the other end being secured to one end of a spring 28, the other end of said spring being secured to the bottom of the casing 4. As a result of this construction, when the lever 17 is depressed by the operator, the spring 28 contracts and by means of the cord causes rotation of the drum 37 relatively to the roller 22 and takes up the slack in the cord 21. When the lever 17 is released by the operator, after a sufficient exposure, the spring 19, which is much stronger than the spring 28, returns the lever 17 to its initial or upper position, and during this return movement, said lever 17 pulls the cord 21, rotating the roller 22. Thus the exposed portion of the film or paper roll is automatically removed from the field covered by the lens 7 and a fresh portion of said paper roll is exposed. The roller 23 is prevented from overrunning by means of a brake 24, carried on an arm 45 pivotally mounted on the bottom of the casing 4. A spring 43 holds the brake 24 always in contact with the axle of the roller 23. By this construction and owing to the fact that the roller 22 is prevented from backward rotation, the strip 8 is always kept taut upon the guide rollers 41.

The depression of the lever 17 causes the lamps 10 to be lighted, in the following way: The batteries are connected with each other, the lamps 10 and contacts 35 and 36 by wires 13, 14 and 15, the wire 15 being connected to the contact 35 and the wire 14 being connected to the contact 36, which is a spring contact. When the lever 17 is depressed, as shown in dotted lines in Fig. 3, it strikes the spring contact 36, forcing it against the contact 35 and completing the circuit, as follows: batteries 12 and lamps 10 (connected by the wire 13) wire 14, contact 36, contact 35 and wire 15 back to the battery. As long as the lever 17 is fully depressed, the lamps 10 are in circuit and lighted. When the lever 17 is released, the spring 19 at once returns it to its original position, breaking the circuit.

As shown in dotted lines in Fig. 2, I preferably provide on the front end of the casing guide ways 31, adapted to receive a card 30 upon which an indication of time may be printed, as the day of the month, said guides and card being so located that the latter will appear in front of the opening 9, as shown in Fig. 2, but not in front of the dials. The meter is preferably provided with a characteristic or designating number, shown at 29, in proximity to the dials, in order that the photographic record will show not only the position of the dials and hands thereon, but also the date on which the record was made and also the number of the meter.

While I have shown in this connection a meter having dials and moving hands, it will be understood that my invention is equally applicable to any style of meter and that the means I employ for making a record of the condition or reading of the meter is equally applicable to any means employed for indicating this condition or reading.

While I have shown my invention in the particular embodiment herein described, I do not, however, limit myself to this construction, but claim any equivalent modification that will readily suggest itself to those skilled in the art.

What I claim is:

1. In combination with a meter, a lens and shutter therefor, a medium sensitive to light, an illuminating means, a casing associated with the meter for containing such lens, sensitive medium and illuminating means, cooperating means carried by the meter and casing for locating the casing in place and a member adapted when operated to open the shutter and operate such illuminating means.

2. In combination with a meter, a lens and shutter therefor, a medium sensitive to light, an illuminating means, a casing associated with the meter for containing such lens, sensitive medium and illuminating means, cooperating means carried by the meter and casing for locating the casing in place and a member adapted when operated to open the shutter, operate such illuminating means and advance such sensitive medium to a proper position for the next record.

3. In combination with a meter, a lens and shutter therefor, a medium sensitive to light, an illuminating means, a casing associated with the meter for containing such lens, sensitive medium and illuminating means, cooperating means carried by the meter and casing for locating the casing in place and a lever adapted when depressed to open the shutter and operate such illuminating means and adapted when returned to its normal position to advance such sensitive medium to a proper position for the next record.

4. In combination with a meter, a lens and shutter therefor, a medium sensitive to light, an illuminating means, a casing associated with the meter for protecting such sensitive medium from light except as admitted through such lens, such casing adapted to support such lens and such illuminating means, coöperating means carried by the meter and casing for locating the casing in place and a member adapted when operated to open the shutter and operate such illuminating means.

5. In combination with a meter, a lens and shutter therefor, a medium sensitive to light, an illuminating means, a casing associated with the meter for protecting such sensitive medium from light except as admitted through such lens, such casing adapted to support such lens and such illuminating means, coöperating means carried by the meter and casing for locating the casing in place and a member adapted when operated to open the shutter, operate such illuminating means and advance such sensitive medium to a proper position for the next record.

6. In combination with a meter, a lens and shutter therefor, a medium sensitive to light, an illuminating means, a casing associated with the meter for protecting such sensitive medium from light except as admitted through such lens, such casing adapted to support such illuminating means, cooperating means carried by the meter and casing for locating the casing in place and a lever adapted when depressed to open the shutter and operate such illuminating means and adapted when returned to its normal position to advance such sensitive medium to a proper position for the next record.

7. As a means for recording the condition of a meter, a casing associated with such meter, a lens and shutter carried by such casing, sensitive film within such casing and protected thereby from the action of light except that entering through the lens, an illuminating means supported by such casing coöperating means carried by the meter and casing for locating the casing in place and a member adapted when operated to open the shutter and operate such illuminating means.

8. As a means for recording the condition of a meter, a casing associated with such meter, a lens and shutter carried by such casing, sensitive film within such casing and protected thereby from the action of light except that entering through the lens, an illuminating means supported by such casing, coöperating means carried by the meter and casing for locating the casing in place and a lever adapted when depressed to open the shutter and operate such illuminating means and adapted when returned to its normal position to advance such film to a proper position for the next record.

9. In combination with a meter, a lens and shutter therefor, a medium sensitive to light, an electric lamp and a source of electric energy for lighting such lamp, a casing associated with the meter for containing such lens, sensitive medium and lamp, co-operating means carried by the meter and casing for locating the casing in place and a member adapted when operated to open the shutter and close a circuit from such source of electric energy through such lamp.

10. In combination with a meter, a lens and shutter therefor, a medium sensitive to light, an electric lamp and a source of electric energy for lighting such lamp, a casing associated with the meter for containing such lens, sensitive medium and lamp, co-operating means carried by the meter and casing for locating the casing in place and a member adapted when operated to open the shutter, close a circuit from such source of electric energy through such lamp and advance such sensitive medium to a proper position for the next record.

11. In combination with a meter, a lens and shutter therefor, a medium sensitive to light, an electric lamp and a source of electric energy for lighting such lamp, a casing associated with the meter for containing such lens, sensitive medium and lamp, coöperating means carried by the meter and casing for locating the casing in place and a lever adapted when depressed to open the shutter and close a circuit from such source of electric energy through such lamp and adapted when returned to its normal position to open such circuit and advance such sensitive medium to a proper position for the next record.

12. In combination with a meter, a lens and shutter therefor, a medium sensitive to light, an electric lamp and a source of electric energy for lighting such lamp, a casing associated with the meter for protecting such sensitive medium from light except as admitted through such lens, such casing adapted to support such lens and such lamp, co-operating means carried by the meter and casing for locating the casing in place and a member adapted when operated to open the shutter and close a circuit from such source of electric energy through such lamp.

13. In combination with a meter, a lens and shutter therefor, a medium sensitive to light, an electric lamp and a source of electric energy for lighting such lamp, a casing associated with the meter for protecting such sensitive medium from light except as admitted through such lens, such casing adapted to support such lens and such lamp, coöperating means carried by the meter and casing for locating the casing in place and a member adapted when operated to open the shutter and close a circuit from such source of electric energy through such lamp and advance such sensitive medium to a proper position for the next record.

14. In combination with a meter, a lens and shutter therefor, a medium sensitive to light, an electric lamp and a source of electric energy for lighting such lamp, a casing associated with the meter for protecting such sensitive medium from light except as admitted through such lens, such casing adapted to support such lens and such lamp, co-operating means carried by the meter and casing for locating the casing in place and a lever adapted when depressed to open the shutter and close a circuit from such source of electric energy through such lamp and adapted when returned to its normal position to open such circuit and advance such sensitive medium to a proper position for the next record.

15. As a means for recording the condition of a meter, a casing associated with such meter, a lens and shutter carried by such casing, sensitive film within such casing and protected thereby from the action of light except that entering through the lens, an electric lamp supported by such casing, a source of electric energy for lighting such lamp, coöperating means carried by the meter and casing for locating the casing in place and a member adapted when operated to open the shutter and close a circuit from such source of electric energy through such lamp.

16. As a means for recording the condition of a meter, a casing associated with such meter, a lens and shutter carried by such casing, sensitive film within such casing and protected thereby from the action of light except that entering through the lens, an electric lamp supported by such casing, a source of electric energy for lighting such lamp, coöperating means carried by the meter and casing for locating the casing in place and a lever adapted when depressed to open the shutter and close a circuit from such source of electric energy through such lamp and adapted when returned to its normal position to open such circuit and advance such sensitive medium to a proper position for the next record.

17. As a means for recording the condition of a meter, a casing associated with such meter, a lens and shutter carried by such casing, sensitive film within such casing and protected thereby from the action of light except that entering through the lens, an electric lamp supported by such casing, a battery carried by such casing and adapted to light such lamp, coöperating means carried by the meter and casing for locating the casing in place and a member adapted when operated to open the shutter and close a circuit from such battery through such lamp.

18. As a means for recording the condition of a meter, a casing associated with such meter, a lens and shutter carried by such casing, sensitive film within such casing and protected thereby from the action of light except that entering through the lens, an electric lamp supported by such casing, a battery carried by such casing and adapted to light such lamp, coöperating means carried by the meter and casing for locating the casing in place and a lever adapted when depressed to open the shutter and close a circuit from such battery through such lamp and adapted when returned to its normal position to open such circuit and advance such film to a proper position for the next record.

19. In combination with a meter, a lens and shutter therefor, a medium sensitive to light, an illuminating means, a casing for containing such lens, sensitive medium and illuminating means, a member adapted when operated to open the shutter and operate such illuminating means, and means associated with the meter and casing for alining the lens relatively to the meter indications.

20. In combination with a meter, a lens and shutter therefor, a medium sensitive to light, an illuminating means, a casing for containing such lens, sensitive medium and illuminating means, a member adapted when operated to open the shutter, operate such illuminating means and advance such sensitive medium to a proper position for the next record, and means associated with the meter and casing for alining the lens relatively to the meter indications.

21. In combination with a meter, a lens and shutter therefor, a medium sensitive to light, an illuminating means, a casing for containing such lens, sensitive medium and illuminating means, a lever adapted when depressed to open the shutter and operate such illuminating means and adapted when returned to its normal position to advance such sensitive medium to a proper position for the next record, and means associated with the meter and casing for alining the lens relative to the meter indications.

22. In combination with a meter, a lens and shutter therefor, a medium sensitive to light, an illuminating means, a casing for protecting such sensitive medium from light except as admitted through such lens, such casing adapted to support such lens and such illuminating means, a member adapted when operated to open the shutter and operate such illuminating means, and means associated with the meter and casing for alining the lens relatively to the meter indications.

23. As a means for recording the condition of a meter, a casing adapted to coöperate with such meter, a lens and shutter carried by such casing, sensitive film within such casing and protected thereby from the action of light except that entering through the lens, an illuminating means supported by such casing, a member adapted when operated to open the shutter and operate such illuminating means, and means associated with the meter and casing for alining the lens relatively to the meter indications.

24. As a means for recording the condition of a meter, a casing adapted to coöperate with such meter, a lens and shutter carried by such casing, sensitive film within such casing and protected thereby from the action of light except that entering through the lens, an illuminating means supported by such casing, a lever adapted when depressed to open the shutter and operate such illuminating means and adapted when returned to its normal position to advance such film to a proper position for the next record, and means associated with the meter and casing for alining the lens relatively to the meter indications.

25. As a means for recording the condition of a meter, a casing adapted to coöperate with such meter, a lens and shutter carried by such casing, sensitive film within such casing and protected thereby from the action of light except that entering through the lens, an electric lamp supported by such casing, a battery carried by such casing and adapted to light such lamp, a member adapted when operated to open the shutter and close a circuit from such battery through such lamp, and means associated with the meter and casing for alining the lens relatively to the meter indications.

26. As a means for recording the condition of a meter, a casing adapted to coöperate with such meter, a lens and shutter carried by such casing, sensitive film within such casing and protected thereby from the action of light except that entering through the lens, an electric lamp supported by such casing, a battery carried by such casing and adapted to light such lamp, a lever adapted when depressed to open the shutter and close a circuit from such battery through such lamp and adapted when returned to its normal position to open such circuit and advance such film to a proper position for the next record, and means associated with the meter and casing for alining the lens relatively to the meter indications.

27. An apparatus of the character described, comprising a meter and a casing adapted to be placed in proximity thereto, said casing containing photographic and illuminating devices and a single lever for actuating said devices, substantially as described.

28. An apparatus of the character described, comprising a meter and a casing containing photographic and illuminating means, said meter and casing being provided with coöperating means for holding them in alinement and with devices whereby the date of the reading of the meter and the number thereof appear on the photograph, when made, substantially as described.

29. An apparatus of the character described, comprising a meter provided with a dial and a distinguishing number or mark, and a casing adapted to be placed in proximity to said meter, photographic and illuminating means in said casing and operating devices for said means, said casing being provided with an opening in the end to be placed next to the meter and a date-bearing device in said opening, substantially as described.

SAMUEL C. SHAFFNER.

Witnesses:
H. M. Curtis,
P. H. Truman.